(12) United States Patent
Lee et al.

(10) Patent No.: US 11,476,879 B2
(45) Date of Patent: *Oct. 18, 2022

(54) METHOD AND DEVICE FOR RECEIVING PTRS FOR CANCELLING PHASE NOISE IN WIRELESS COMMUNICATION SYSTEM

(71) Applicant: LG ELECTRONICS INC., Seoul (KR)

(72) Inventors: Kilbom Lee, Seoul (KR); Jiwon Kang, Seoul (KR); Kijun Kim, Seoul (KR); Kyuseok Kim, Seoul (KR); Kunil Yum, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

This patent is subject to a terminal disclaimer.

(21) Appl. No.: 17/101,959

(22) Filed: Nov. 23, 2020

(65) Prior Publication Data

US 2021/0075453 A1 Mar. 11, 2021

Related U.S. Application Data

(63) Continuation of application No. 16/518,678, filed on Jul. 22, 2019, now Pat. No. 10,886,956, which is a
(Continued)

(51) Int. Cl.
*H04B 1/10* (2006.01)
*H04B 7/0456* (2017.01)
(Continued)

(52) U.S. Cl.
CPC ............. *H04B 1/10* (2013.01); *H04B 7/0473* (2013.01); *H04B 7/06* (2013.01); *H04B 7/0632* (2013.01);
(Continued)

(58) Field of Classification Search
None
See application file for complete search history.

(56) References Cited

U.S. PATENT DOCUMENTS 10,447,319 B1 * 10/2019 Lee .................. H04L 5/006
10,886,956 B2 * 1/2021 Lee .................. H04B 1/10
(Continued)

FOREIGN PATENT DOCUMENTS

CN 101645868 2/2010
CN 102714527 10/2012
(Continued)

OTHER PUBLICATIONS

State Intellectual Property Office of the People's Republic of China Application Serial No. 201880019282.6, Office Action dated Jul. 27, 2021, 7 pages.
(Continued)

*Primary Examiner* — Xavier S Wong
(74) *Attorney, Agent, or Firm* — Lee Hong Degerman Kang Waimey

(57) ABSTRACT

A method for operating a user equipment in a wireless communication is provided as an embodiment of the present invention. The method may include: receiving modulation and coding scheme (MCS) information for each of two or more codewords from a base station (BS); determining a demodulation reference signal (DMRS) antenna port to which a phase tracking reference signal (PTRS) antenna port is mapped based on the MCS information; and receiving a PTRS based on the DMRS antenna port, wherein a DMRS antenna port with the lowest index among one or more DMRS antenna ports included in a codeword with the highest MCS among the two or more codewords may be determined as the DMRS antenna port.

16 Claims, 4 Drawing Sheets

Related U.S. Application Data continuation of application No. 16/065,128, filed as application No. PCT/KR2018/003455 on Mar. 23, 2018, now Pat. No. 10,447,319.

(60) Provisional application No. 62/476,744, filed on Mar. 25, 2017, provisional application No. 62/520,666, filed on Jun. 16, 2017, provisional application No. 62/525,775, filed on Jun. 28, 2017, provisional application No. 62/531,299, filed on Jul. 11, 2017.

(51) Int. Cl.
*H04B 7/06* (2006.01)
*H04L 1/00* (2006.01)
*H04L 5/00* (2006.01)

(52) U.S. Cl.
CPC .............. *H04L 1/00* (2013.01); *H04L 1/0003* (2013.01); *H04L 1/0026* (2013.01); *H04L 5/00* (2013.01); *H04L 5/0048* (2013.01)

(56) References Cited

U.S. PATENT DOCUMENTS

| | | |
|---|---|---|
| 2010/0034312 A1 | 2/2010 | Muharemovic et al. |
| 2011/0019776 A1 | 1/2011 | Zhang et al. |
| 2011/0250848 A1 | 10/2011 | Bergljung et al. |
| 2013/0163528 A1 | 6/2013 | Kim et al. |
| 2014/0133395 A1 | 5/2014 | Nam et al. |
| 2014/0254516 A1 | 9/2014 | Lee et al. |
| 2014/0341154 A1 | 11/2014 | Ogawa et al. |
| 2015/0207609 A1 | 7/2015 | Nam et al. |
| 2015/0223208 A1 | 8/2015 | Park et al. |
| 2015/0263796 A1 | 9/2015 | Nam et al. |
| 2016/0006594 A1 | 1/2016 | Persson et al. |
| 2017/0126376 A1 | 5/2017 | Wang et al. |
| 2017/0373814 A1 | 12/2017 | Kwon et al. |
| 2018/0091350 A1 | 3/2018 | Akkarakaran et al. |
| 2018/0227866 A1 | 8/2018 | Jung et al. |
| 2018/0270699 A1* | 9/2018 | Babaei .............. H04W 28/0278 |
| 2018/0279193 A1 | 9/2018 | Park et al. |
| 2018/0287759 A1 | 10/2018 | Kundargi et al. |
| 2018/0331699 A1 | 11/2018 | Lin et al. |
| 2019/0037428 A1 | 1/2019 | Astrom et al. |
| 2019/0074884 A1 | 3/2019 | Shen et al. |
| 2019/0140799 A1 | 5/2019 | Gao et al. |
| 2019/0222385 A1 | 7/2019 | Hessler et al. |
| 2019/0296876 A1* | 9/2019 | Zhang .................... H04L 5/0048 |
| 2019/0326964 A1 | 10/2019 | Li et al. |
| 2019/0341950 A1 | 11/2019 | Lee et al. |
| 2019/0393937 A1 | 12/2019 | Kim et al. |
| 2020/0259609 A1* | 8/2020 | Saito ..................... H04L 27/261 |

FOREIGN PATENT DOCUMENTS

| | | |
|---|---|---|
| CN | 103918195 | 7/2014 |
| CN | 106105052 | 11/2016 |
| CN | 102939739 | 5/2017 |
| JP | 2019537856 | 12/2019 |
| KR | 20130064068 | 6/2013 |
| KR | 20130073870 | 7/2013 |
| KR | 20170028983 | 3/2017 |
| RU | 2527930 | 9/2014 |
| WO | 2009099306 | 8/2009 |
| WO | 2017017564 | 2/2017 |

OTHER PUBLICATIONS

LG Electronics, "Discussion on Phase Tracking RS for UL," R1-1702464, 3GPP TSG RAN WG1 Meeting #88, Feb. 2017, 4 pages.
United States Patent and Trademark Office U.S. Appl. No. 16/518,678, Notice of Allowance dated Oct. 13, 2020, 8 pages.
United States Patent and Trademark Office U.S. Appl. No. 16/518,678, Office Action dated Aug. 5, 2020, 10 pages.
European Patent Office Application Serial No. 18777624.0, Search Report dated Oct. 19, 2020, 19 pages.
Qualcomm Incorporated, "Phase and frequency tracking reference signal considerations", R1-1700808, 3GPP TSG-RAN WG1 #87AH, Jan. 2017, 7 pages.
LG Electronics, "Reference Signal for Frequency offset and Phase Tracking", R1-1611809, 3GPP TSG RAN WG1 Meeting #87, Nov. 2016, 7 pages.
Japan Patent Office Application No. 2019-520584, Office Action dated Mar. 2, 2021, 2 pages.
LG Electronics, "On DL PT-RS design," R1-1710296, 3GPP TSG RAN WG1 Meeting NR Ad-Hoc #2, Jun. 2017, 5 pages.
NTT DOCOMO, Inc., "Views on PT-RS," R1-1708461, 3GPP TSG RAN WG1 Meeting #89, May 2017, 4 pages.
Canadian Intellectual Property Office Application Serial No. 3,032,798, Office Action dated Jan. 29, 2020, 5 pages.
Ericsson, "SRS design", 3GPP TSG RAN WG1 Meeting #87 ah-NR, R1-1701161, Jan. 2017, 10 pages.
PCT International Application No. PCT/KR2018/003455, Notification of Transmittal of the International Search Report and the Written Opinion of the International Searching Authority, or Declaration dated Aug. 29, 2018, 11 pages.
Nokia, et al., "On the PTRS design for NR", 3GPP TSG RAN WG1 NR Ad-Hoc Meeting, R1-1701105, Jan. 2017, 17 pages.
Ericsson, "On PTRS performance", 3GPP TSG RAN WG1 Meeting #88, R1-1703221, Feb. 2017, 11 pages.
LG Electronics, "Discussion on Phase Tracking RS for DL", 3GPP TSG RAN WG1 NR ad-hoc Meeting, R1-1700484, Jan. 2017, 6 pages.
United States Patent and Trademark Office U.S. Appl. No. 16/065,128, Notice of Allowance dated Jun. 7, 2019, 10 pages.
United States Patent and Trademark Office U.S. Appl. No. 16/065,128, Office Action dated Feb. 12, 2019, 11 pages.
United States Patent and Trademark Office U.S. Appl. No. 16/065,128, Office Action dated Nov. 23, 2018, 11 pages.
3GPP TSG-RAN WG1 #88, R1-1703220, "On PTRS Design" Agenda item 8.1.2.4.3 by Ericsson, Feb. 13-17, 2017 (Athens, Greece) (Year: 2017).
CSP Search Report at KIPO (completed Jan. 21, 2019 and delivered Jan. 22, 2019) (Year: 2019).
European Patent Office Application Serial No. 18777624.0, Search Report dated Jan. 11, 2021, 25 pages.
Intel Corporation, "On RS for Phase Tracking," 3GPP TSG-RAN WG1 #88, R1-1702213, Feb. 2017, 4 pages.
CMCC, "Phase-Tracking Reference Signal Design for High-Frequency Systems," 3GPP TSG RAN WG1 Meeting #88, R1-1703406, Feb. 2017, 11 pages.
Nokia et al., "On PT-RS Design for NR," 3GPP TSG RAN WG1 #88, R1-1703182, Feb. 2017, 7 pages.
Russian Federation Federal Service for Intellectual Property, Patents and Trademarks Application Serial No. 2019104275, Notice of Allowance dated Apr. 27, 2020, 18 pages.
Huawei, HiSilicon, "PTRS for CP-OFDM", R1-1706937, 3GPP TSG RAN WG1 Meeting #89, May 2017, 6 pages.
Panasonic, "PT-RS port association and indication", R1-1705160, 3GPP TSG RAN WG1 Meeting #88bis, Apr. 2017, 5 pages.
LG Electronics, et al., "WF on additional RS for NR", R1-168347, 3GPP TSG RAN1 #86, Aug. 2016, 4 pages.
Nokia, et al., "WF on Phase Noise Modeling", R1-165685, 3GPP TSG RAN WG1 #85, May 2016, 8 pages.
LG Electronics, "Discussion on Common Phase Compensation for above 6GHz", R1-166909, 3GPP TSG RAN WG1 Meeting #86, Aug. 2016, 7 pages.
Intel Corporation, "WFon evaluation assumptions for initial access in NR", R1-168239, 3GPP TSG-RAN1 Meeting #86, Aug. 2016, 4 pages.
Japan Patent Office Application No. 2019-520584, Office Action dated Jun. 30, 2020, 3 pages.
Lenovo et al., "Remaining issues on PTRS," 3GPP TSG RAN WG1 Meeting 90bis, R1-1717854, Prague, CZ, Oct. 9-13, 2017, 4 pages.

(56) References Cited

OTHER PUBLICATIONS

CATT, "Remaining issues on PT-RS," 3GPP TSG RAN WG1 Meeting AH 1801, R1-1800246, Vancouver, Canada, Jan. 22-26, 2018, 5 pages.
LG Electronics, "On PT-RS design," 3GPP TSG RAN WG1 Meeting 90bis, R1-1717947, Prague, CZ, Oct. 9-13, 2017, 22 pages.
LG Electronics, "Text proposals on TS 38.212 for LI reporting," 3GPP TSG RAN WG1 Meeting AH 1801, R1-1800361, Vancouver, Canada, Jan. 22-26, 2018, 6 pages.
LG Electronics, "Discussion on Phase Tracking RS for DL," 3GPP TSG RAN WG1 Meeting #88, R1-1702463, Athens, Greece, Feb. 13-17, 2017, 6 pages.

* cited by examiner

METHOD AND DEVICE FOR RECEIVING PTRS FOR CANCELLING PHASE NOISE IN WIRELESS COMMUNICATION SYSTEM

CROSS-REFERENCE TO RELATED APPLICATIONS

This application is a continuation of U.S. patent application Ser. No. 16/518,678, filed on Jul. 22, 2019, which is a continuation of U.S. patent application Ser. No. 16/065,128, filed on Jun. 21, 2018, now U.S. Pat. No. 10,447,319, which is the National Stage filing under 35 U.S.C. 371 of International Application No. PCT/KR2018/003455, filed on Mar. 23, 2018, which claims the benefit of U.S. Provisional Application Nos. 62/476,744, filed on Mar. 25, 2017, 62/520,666, filed on Jun. 16, 2017, 62/525,775, filed on Jun. 28, 2017, and 62/531,299, filed on Jul. 11, 2017, the contents of which are all hereby incorporated by reference herein in their entirety.

TECHNICAL FIELD

The present invention relates to a wireless communication system, and more particularly, to a method for receiving a phase tracking reference signal (PTRS) for phase noise cancellation in a system and apparatus therefor.

BACKGROUND ART

An ultra-high frequency radio communication system using mmWave is configured to operate at a center frequency in the range of several GHz to several tens of GHz. Due to such a center frequency feature, significant path loss may occur in a shadow area in the mmWave communication system. Considering that a synchronization signal should be stably transmitted to all user equipments (UEs) located within coverage of a base station (BS), the synchronization signal needs to be designed and transmitted in consideration of the potential deep-null phenomenon, which may occur due to the above-described ultra-high frequency band characteristic, in the mmWave communication system.

DISCLOSURE OF THE INVENTION

Technical Task

The present invention is contrived to solve the aforementioned problems. Accordingly, an object of the present invention is to provide a method for receiving a PTRS.

Another object of the present invention is to accurately decode received signals by improving the phase noise cancellation procedure performed by a user equipment (UE) in a wireless communication system.

A further object of the present invention is to provide a method for improving efficiency of signal transmission for phase noise cancellation.

Still another object of the present invention is to improve receiving-side operation by providing information on signal transmission for phase noise cancellation.

Still a further object of the present invention is to provide a method of transmitting a signal for phase noise cancellation by considering phase noise compensation and reference signal overhead.

Technical Solutions

In an aspect of the present invention, provided herein is a method for operating a user equipment (UE) in a wireless communication system. The method may include: receiving modulation and coding scheme (MCS) information for each of two or more codewords from a base station (BS); determining a demodulation reference signal (DMRS) antenna port to which a phase tracking reference signal (PTRS) antenna port is mapped based on the MCS information; and receiving a PTRS based on the DMRS antenna port, wherein a DMRS antenna port with the lowest index among one or more DMRS antenna ports included in a codeword with the highest MCS among the two or more codewords may be determined as the DMRS antenna port.

If the two or more codewords have the same MCS, a DMRS antenna port with the lowest index among all DMRS antenna ports included in the two or more codewords may be determined as the DMRS antenna port.

All DMRS antenna ports included in the two or more codewords may belong to one DMRS antenna port group.

If all DMRS antenna ports included in the two or more codewords belong to two or more DMRS antenna port groups, the number of PTRS antenna ports may be equal to or less than the number of two or more DMRS antenna port groups.

The method may further include receiving information on the number of PTRS antenna ports from the BS.

When all DMRS antenna ports included in the two or more codewords belong to the two or more DMRS antenna port groups, if the number of PTRS antenna ports is one, a DMRS antenna port with the lowest index among one or more DMRS antenna ports belonging to a DMRS antenna port group included in the codeword with the highest MCS among the two or more codewords may be determined as the DMRS antenna port.

The method may further include: transmitting, to the BS, channel quality information (CQI) for each of the two or more codewords; and transmitting, to the BS, the layer index of a layer with the best channel quality among one or more layers included in a codewords with the highest CQI among the two or more codewords.

In another aspect of the present invention, provided herein is a user equipment (UE) operating in a wireless communication system. The UE includes: a transceiver configured to transmit and receive signals to and from a base station (BS); and a processor connected to the transceiver, wherein the processor is configured to: receive modulation and coding scheme (MCS) information for each of two or more codewords from the BS; determine a demodulation reference signal (DMRS) antenna port to which a phase tracking reference signal (PTRS) antenna port is mapped based on the MCS information; and receive a PTRS based on the DMRS antenna port, wherein a DMRS antenna port with the lowest index among one or more DMRS antenna ports included in a codeword with the highest MCS among the two or more codewords may be determined as the DMRS antenna port.

Advantageous Effects

According to the present specification, received signals can be accurately decoded by improving a phase noise cancellation procedure performed by a user equipment (UE) in a wireless communication system.

According to the present specification, a method for improving efficiency of signal transmission for phase noise cancellation can be provided.

According to the present specification, receiving-side operation can be improved by providing information on the signal transmission for the phase noise cancellation.

According to the present specification, a PTRS allocation method can be provided.

According to the present specification, a method of transmitting a signal for the phase noise cancellation by considering compensation for phase noise and reference signal overhead can be provided.

It will be appreciated by persons skilled in the art that the effects that can be achieved through the present specification are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
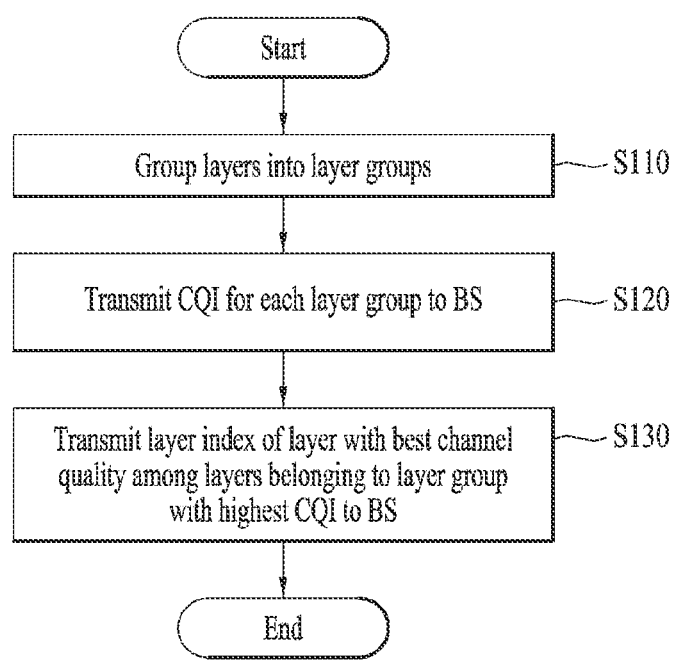
FIG. 1 illustrates a method by which a UE transmits a layer index according to an embodiment of the present invention.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this specification, the embodiments of the present invention have been described based on a data transmission and reception relationship between a mobile station and a base station. Here, the base station may mean a terminal node of the network which directly communicates with the mobile station. In this document, a specific operation described as performed by the base station can also be performed by an upper node of the base station.

That is, in the network consisting of a plurality of network nodes including the base station, various operations performed for communication with the mobile station may be performed by the base station or other network nodes except the base station. The term "base station" may be replaced with terms such as "fixed station", "Node B", "eNode B (eNB)", "advanced base station (ABS)", "access point", etc.

The term "mobile station (MS)" may be replaced with terms such as "user equipment (UE)", "subscriber station (SS)", "mobile subscriber station (MSS)", "mobile terminal", "advanced mobile station (AMS)", "terminal", etc.

In addition, a transmitting end refers to a fixed and/or mobile node that transmits data or voice services, and a receiving end refers to a fixed and/or mobile node that receive data or voice services. Accordingly, in uplink, the mobile station and base station may correspond to the transmitting end and receiving end, respectively. Similarly, in downlink, the mobile station and base station may correspond to the receiving end and transmitting end, respectively.

When a device performs communication with a 'cell', it may indicate that the device transmits and receive signals with a base station of the cell. That is, although the device actually transmits and receives signals with a specific base station, it can be interpreted to mean that the device transmits and receives signals with a cell formed by the specific base station. Similarly, "macro cell" and/or "small cell" may mean not only specific coverage but also "macro base station supporting the macro cell" and/or "small cell base station supporting the small cell".

The embodiments of the present invention can be supported by standard documents disclosed in at least one of wireless access systems including the IEEE 802.xx system, 3GPP system, 3GPP LTE system, and 3GPP2 system. That is, the steps or parts, which are not explained to clearly reveal the technical idea of the present invention, in the embodiments of the present invention may be supported by the above documents.

In addition, details of all terms mentioned in the present document can be found in the above standard documents. In particular, the embodiments of the present invention can be supported by at least one of documents P802.16e-2004, P802.16e-2005, P802.16.1, P802.16p and P802.16.1b, which are standard documents for the IEEE 802.16 system.

Hereinafter, the preferred embodiments of the present invention will be described in detail with reference to the accompanying drawings. It is to be understood that the detailed description which will be disclosed along with the accompanying drawings is intended to describe the exemplary embodiments of the present invention and is not intended to describe a unique embodiment for carrying out the present invention.

It should be noted that specific terms disclosed in the present invention are provided for better understanding of the present invention and these specific terms may be changed to other terms without departing from the technical scope or spirit of the present invention.

According to an embodiment of the present invention, all layers may have the same common phase error (CPE). In this case, a BS may transmit a phase tracking reference signal (PTRS) via a certain layer among a plurality of layers, which are configured for the BS, and each layer may have different reception quality (e.g., SNR or SINR). In this case, the BS transmits the PTRS via a layer (or DMRS port) with the highest quality to improve UE' estimation performance. For example, a PTRS antenna port may be mapped to one DMRS port in one DMRS antenna port group. If a PTRS antenna port is mapped to a DMRS antenna port (or precoding) with the best channel quality, CPE estimation performance may be improved. However, to this end, separate signaling should be defined. Meanwhile, if an MCS is defined per codeword (CW), the BS/UE may know which CW has the best quality. That is, based on the CW features, it is possible to reduce signaling overhead required for indicating the DMRS antenna port (or precoding) with the best channel quality.

For example, in the case of downlink, a UE may report CQI every CW (or layer group). The CW is composed of one or more layers. For example, in the new radio (NR) system, up to two CWs are allowed, and the maximum number of layers in each CW may be set to 4. For example, if five layers are configured, CW #0 may have two layers, and CW #1 may have three layers.

As another example, the two CWs may belong to one DMRS (antenna) port group. Alternatively, one CW may have two DMRS antenna port groups. In other words, it is possible to define a layer group and a DMRS antenna port group in an independent manner For example, when one DMRS antenna port group has two CWs, the BS may know which CW has a better quality by receiving CQI per CW. If the BS maps a PTRS antenna port to one of DMRS antenna ports belonging to the better CW, the CPE estimation performance may be improved. Meanwhile, the UE may know the CW selected by the BS for PTRS mapping after checking the MCS of the CW. However, the UE cannot know which DMRS antenna port is mapped to the PTRS antenna port. To this end, the following method may be considered.

As another example, when all DMRS antenna ports included in two or more CWs belong to two or more DMRS antenna port groups and when the number of PTRS antenna ports is one, a DMRS antenna port with the lowest index among one or more DMRS antenna ports included in a DMRS antenna port group(s) included in a CW with the highest MCS among the two or more CWs may be determined as the DMRS antenna port.

FIG. 1 illustrates a method by which a UE transmits a layer index according to an embodiment of the present invention.

Referring to FIG. 1, the UE may group a plurality of layers into two or more layer groups [S110]. For example, in the LTE and NR system, up to two layer groups (or CWs) may be allowed. Thereafter, the UE may transmit channel quality information (CQI) for each of the two or more layer groups (or CWs) to the BS [S120]. In the commercial communication system (e.g., LTE, NR, etc.), the UE performs grouping of layers and defines different CQI for each group. In addition, the UE may repot the CQI to the BS. In this case, the CQI report includes that a certain layer group has a higher quality than other layer groups.

Next, the UE may transmit, to the BS, the layer index of a layer with the best channel quality among one or more layers belonging to a layer group with the highest CQI among the two or more layer groups [S130].

For example, the UE may select the layer with the highest quality from the layer group with the highest CQI and repot the selected layer to the BS. In this case, the UE may reduce overhead required for reporting the best layer. For example, in the case of rank=7, two layer groups may be defined, and the two layer groups may have three layers and four layers, respectively. If the CQI of the first layer group is better than that of the second layer group, the best layer may be selected from the first layer group. In this case, layers included in each layer group may be indexed from 0 in each layer group. Thus, when there are seven layers, three-bit overhead is required to inform the best layer. However, when the CQI is used, the amount of required overhead is reduced to two bits. That is, the overhead is reduced by one bit. In summary, if the UE uses the CQI in reporting the layer with the highest quality to the transmitter, the overhead may be reduced.

Figure 2:
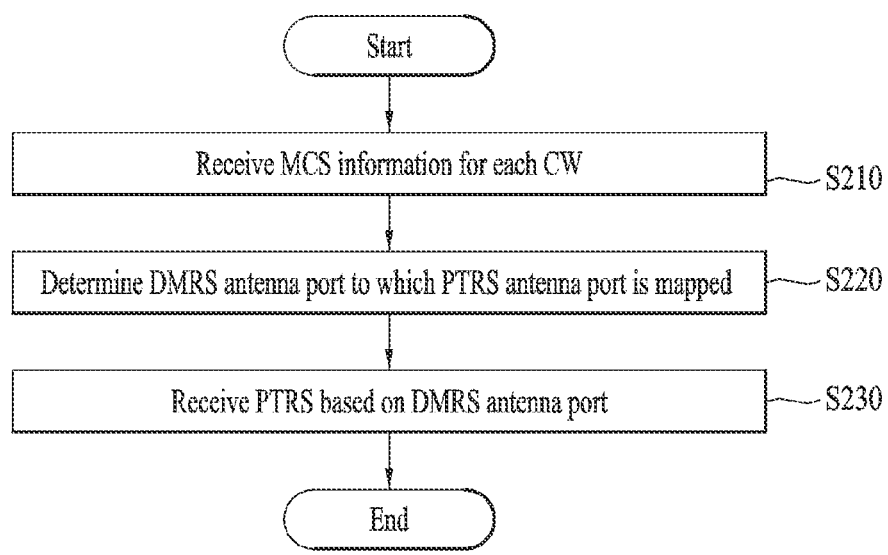
FIG. 2 illustrates a method by which a UE receives a PTRS according to an embodiment of the present invention.

FIG. 2 illustrates a method by which a UE receives a PTRS according to an embodiment of the present invention.

Referring to FIG. 2, the UE may receive modulation and coding scheme (MCS) information for each of two or more CWs from the BS [S210]. For example, in the LTE and NR system, up to two layer groups (or CWs) may be allowed.

For example, the BS may determine the MCS based on CQI for each of the layer groups. In this case, the CQI-based determination means that the BS determines the MCS using the CQI for each layer group, but it may also means that the BS determines the MCS regardless of the CQI for each layer group.

When the BS determines the MCS using the CQI for each layer group, the BS may map DMRS antenna ports to PTRS antenna ports such that a plurality of layers belonging to the layer group (or CW) with the highest CQI match the PTRS antenna ports.

For example, in 8-layer transmission, first and second CWs are defined, and it is assumed that the first CW is mapped to DMRS antenna ports #1 to #4 and the second CW is mapped to DMRS antenna ports #5 to #8. In this case, if the CQI of the first CW is better than that of the second CW, DMRS antenna ports #1 to #4 may correspond to PTRS antenna ports #11 to #14. At this time, PTRS ports #11 to #14 may be alternately transmitted in the frequency domain. Alternatively, if the CQI of the second CW is better than that of the first CW, DMRS antenna ports #5 to #8 may correspond to PTRS antenna ports #11 to #14.

As another example, when the two CWs have the same CQI, the UE may preferentially use a specific CW (e.g., the first CW) at all times. As a further example, the UE may select a CW with more layers. In this case, it is expected that the spatial diversity will be relatively increased. Meanwhile, some of PTRS antenna ports #11 to #14 may be selected, and then the selected PT-RS ports may be alternately transmitted in the frequency domain. For example, if the number of PTRS antenna ports available for RRC is 2, only PTRS antenna ports #11 and #12 are alternately transmitted in the frequency domain.

In other words, the BS may group layers and define a different MCS for each group. In this case, the BS may determine the layer grouping and the MCS of each layer group based on layer grouping information and CQI reported by the UE. At this time, although the BS may use the grouping information and CQI reported by the UE as it is, it is not guaranteed. For the similar reasons, the BS may not transmit the PTRS via the best layer, which is recommended by the UE.

When transmitting layers, the BS may define a DMRS antenna port for each layer. Thus, in this case, it can be represented that PTRS antenna ports are mapped to layers, and more preferably, PTRS antenna ports are mapped to DMRS antenna ports. In addition, mapping of a PTRS antenna port to a DMRS antenna port may mean that the PTRS antenna port has the same precoder as that of the DMRS antenna port to which the PTRS antenna port is mapped. Moreover, the PTRS antenna port and DMRS antenna port may be located at the same frequency location. In this case, the size (e.g., norm 2) of the precoder may be different or equal.

As described above, the UE may determine the DMRS antenna port to which the PTRS antenna port is mapped [S220].

For example, the UE may determine the antenna port where a phase tracking reference signal (PTRS) is transmitted.

For example, when the BS maps a PTRS to be transmitted to a DMRS antenna port (or layer) with the best quality, the BS may explicitly inform the UE of the DMRS antenna port to which the PTRS antenna port is mapped. In this case, if the PTRS antenna port transmitted from the BS is mapped to one of DMRS antenna ports belonging to a CW with the highest MCS, signaling overhead may be reduced.

For example, in the case of rank=7, two CWs may be defined, and the two CWs may have three DMRS antenna ports and four DMRS antenna ports, respectively. If the MCS of the first CW is higher than that of the second CW, the DMRS antenna port with the best quality may be selected from among DMRS antenna ports belonging to the first CW. Thus, when there are seven DMRS antenna ports, three-bit overhead is required to inform the DMRS antenna port with the best quality. However, when the MCS is used, the amount of required overhead is reduced to two bits. That is, the overhead is reduced by one bit. In summary, if the BS informs the UE of the index of the DMRS antenna port to which the PTRS antenna port is mapped, the overhead may be reduced based on the MCS information.

As another example, when two or more CWs have the same MCS, the antenna port index may indicate the antenna port included in the CW (e.g., CW #0) with the lowest index among antenna port groups.

As a further example, the PTRS may be received via an antenna port with the lowest index among antenna ports included in a CW with the highest MCS among CWs.

For example, when the UE is scheduled with two CWs, the PTRS antenna port may be associated with a DMRS antenna port with the lowest index among DMRS antenna ports allocated for a CW with a higher MCS. If the two CWs have the same MCS, the PTRS antenna port may be associated with a DMRS antenna port with the lowest index allocated to CW #0. Alternatively, if the two CWs have the same MCS, the PTRS antenna port may be associated with a DMRS antenna port with the lowest index among all DMRS antenna ports included in the two CWs.

As another example, when the UE is scheduled with two CWs, the PTRS antenna port may be associated with a DMRS antenna port with the highest index among DMRS antenna ports allocated for a CW with a higher MCS. In addition, if the two CWs have the same MCS, the PTRS antenna port may be associated with a DMRS antenna port with the highest index allocated to CW #0. Alternatively, if the two CWs have the same MCS, the PTRS antenna port may be associated with a DMRS antenna port with the highest index among all DMRS antenna ports included in the two CWs.

Meanwhile, if a PTRS antenna port is associated with a DMRS antenna port group (1:M(>=1)), the CPE or phase shift estimation value, which is calculated using the PTRS port, may be applied to all DMRS antenna ports belonging to the DMRS antenna port group. In addition, if a PTRS antenna port is associated with a DMRS antenna port (1:1), the PTRS antenna port and DMRS antenna port use the same precoder, and they may be defined at the same frequency location.

All DMRS antenna ports included in two or more CWs may belong to one DMRS antenna port group, or they may belong to two or more DMRS antenna port groups. For example, if all DMRS antenna ports included in two or more DMRS CWs belong to two or more DMRS antenna port groups, the number of PTRS antenna ports may be equal to or less than the number of two or more DMRS antenna port groups.

For example, when a DMRS antenna port group exists and one or two CWs exist, one PTRS antenna port may be defined. In this case, the above-described embodiment may be applied. Meanwhile, when two DMRS antenna port groups exist and one or two CWs exists, two PTRS antenna ports may be defined. The number of PTRS ports may be equal to or less than the number of DMRS antenna port groups. In this case, the number of CWs does not affect the number of PTRS antenna ports. In addition, each of the two PTRS antenna ports may be mapped to anyone among DMRS ports in each of the two DMRS antenna port groups. For example, each of the two PTRS antenna ports may be associated with a DMRS port with the lowest index among DMRS ports in each of the two DMRS antenna port groups.

Moreover, the UE may receive information on the number of PTRS antenna ports from the BS.

When transmitting a PTRS antenna port, the BS may map the PTRS antenna port to a DMRS antenna port with the lowest index among allocated DMRS antenna ports. This can be achieved if the BS allocates the DMRS antenna port with the lowest index to the layer with the best quality, which is reported by the UE. By doing so, in this case, the BS does not need to explicitly inform the UE of the DMRS antenna port to which the PTRS antenna port is mapped.

Meanwhile, when the BS transmits two CWs to the UE, one or more DMRS antenna ports may be defined per CW. For example, in the case of rank=7, CW #0 may have DMRS antenna ports #0, #1, and #2, and CW #1 may have DMRS antenna ports #3, #4, #5, and #6. If the PTRS port is mapped to a DMRS antenna port with the lowest index regardless of the MCS of each CW, the following problem may occur. For example, according to this mapping scheme, if the MCS of CW #0 is lower than that of CW #1, the PTRS antenna port is mapped to a DMRS antenna port with a low MCS. To overcome this problem, the PTRS antenna port should be mapped to a DMRS antenna port with the lowest index in a DMRS antenna port group with a high MCS.

For example, assuming that the UE reports column #3 of CW #0, the BS may switch between the location of the third column and the location of the first column. In other words, a DMRS antenna port corresponding to the first precoding may have the best quality. Therefore, the BS may map the PTRS antenna port to the DMRS port corresponding to the first column (precoding) at all times. In this case, the BS does not need to inform the UE of the DMRS antenna port to which the PTRS antenna port is mapped.

Thereafter, the UE may receive the PTRS based on the determined DMRS antenna port [S230].

Figure 3:
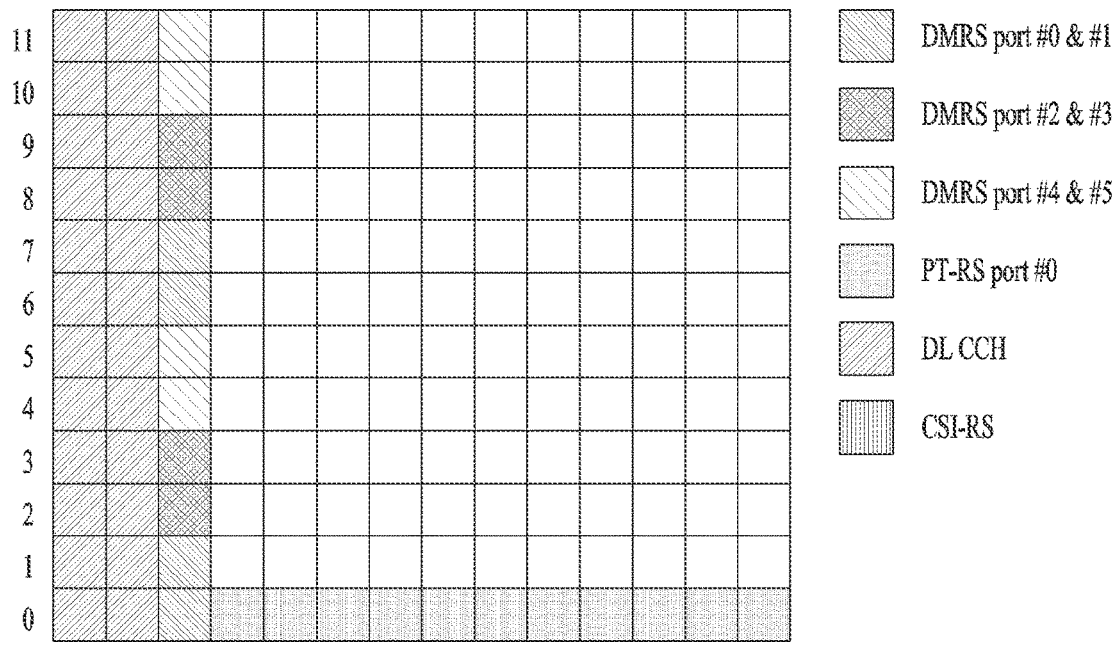
FIG. 3 illustrates a method for mapping PTRS ports to DMRS ports.
Figure 4:
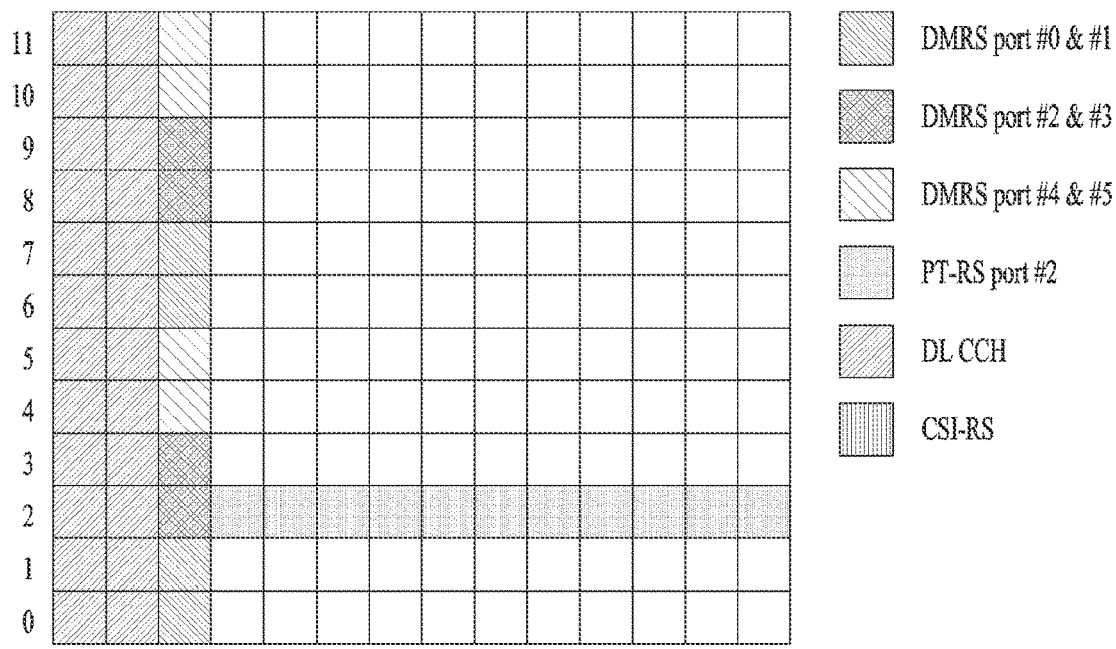
FIG. 4 illustrates a method for mapping PTRS ports to DMRS ports.

FIGS. 3 and 4 illustrate a method for mapping PTRS ports to DMRS ports.

Referring to FIG. 3, in one CW, a PTRS may be associated with a DMRS antenna port with the lowest index in a DMRS antenna port group. For example, in FIG. 3, if the DMRS antenna port group is composed of DMRS antenna ports #0, #1, and #2, the PTRS antenna port may be associated with DMRS antenna port #0. However, when two CWs are applied as described above, a DMRS port to which the PTRS needs to be mapped should be determined. For example, it is assumed that the first CW (CW #0) corresponds to DMRS ports {#0, #1} and the second CW (CW #1) corresponds to DMRS ports {#2, #3, #4}. In this case, for example, if the PTRS is mapped to a DMRS antenna port belonging to a CW with a higher MCS, it is expected that the performance will be improved. In other words, the PTRS needs to be matched with the DMRS antenna port belonging to the CW the higher MCS. In this case, the BS (e.g., gNB) may select a CW that can be mapped to the PTRS base on CQI reported by the UE. In this case, additional gains can be determined according to Equation 1 by considering CPE performance improvement.

$$\text{Additional gain} = 1.8\ \text{dB} \times \text{CQI difference between two CWs} \quad (1)$$

In this case, as another example, two CWs may be used as shown in FIG. 4. In this case, for example, if a UE is allocated rank 5 or more, two CWs may be used. At this time, a PTRS may be associated with a DMRS antenna port with the lowest index in a CW with the highest MCS.

For example, referring to FIG. 4, the first CW (CW #0) may be matched with DMRS antenna ports {#0, #1}, and the second CW (CW #1) may be matched with DMRS antenna ports {#2, #3, #4}.

In this case, the MCS of the second CW is higher than that of the first CW (or when the CQI of the second CW is higher than that of the first CW), the PTRS port may be associated with a DMRS antenna port with the lowest index in the second CW. That is, the PTRS port may be associated with DMRS antenna port #2. By doing so, the CPE estimation performance may be improved based on the PTRS without any signaling overhead.

In addition, for example, in the case of downlink, the UE may report the best layer in a specific CW. In this case, the UE selects a layer corresponding to a CW with high CQI for a downlink PTRS and reports it to the BS via the selected layer, thereby reducing reporting bits. For example, uplink control information (UCI) feedback bits may be decreased from 3 bits to 2 bits.

Moreover, in the case of uplink, the UE may transmit an uplink PTRS to the BS via the best layer. The BS may inform the UE of a layer to be used for uplink PTRS transmission through DCI. In this case, if a layer corresponding to a CW with a high MCS is selected as described above, the number of bits in a corresponding field included in DCI may be reduced. However, the present invention is not limited thereto.

Figure 5:
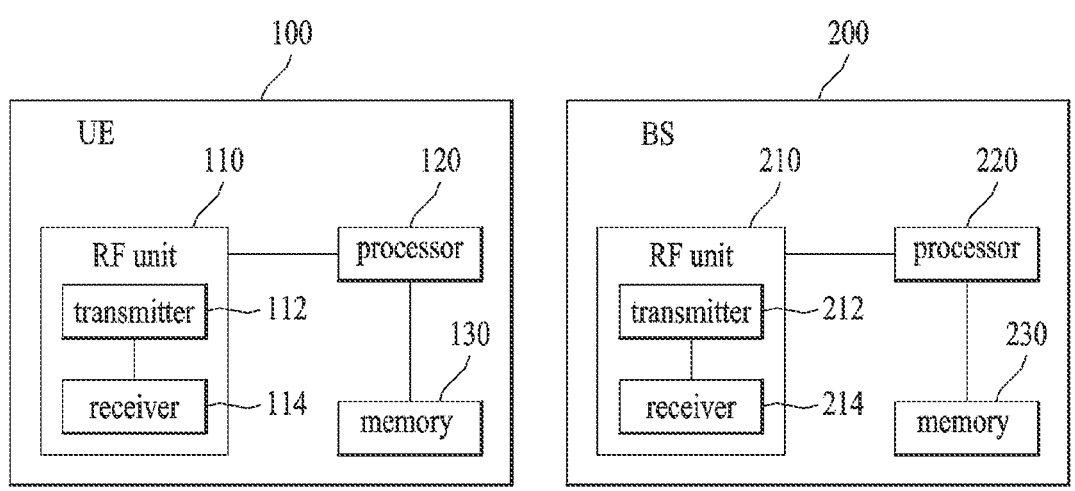
FIG. 5 is a diagram illustrating the configuration of a user equipment and a base station according to an embodiment of the present invention.

FIG. 5 is a diagram illustrating the configuration of a user equipment and a base station according to an embodiment of the present invention. In FIG. 5, the user equipment 100 and the base station 200 may include radio frequency (RF) units 110 and 210, processors 120 and 220 and memories 130 and 230, respectively. Although FIG. 5 shows a 1:1 communication environment between the user equipment 100 and base station 200, a communication environment may be established between a plurality of user equipments and a base station. In addition, the configuration of the base station 200 shown in FIG. 5 can be applied to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other user equipments, and the processor 120 is functionally connected to the transmitter 112 and the receiver 114 to control processes performed at the transmitter 112 and the receiver 114 for transmitting and receiving signals to and from other devices. The processor 120 processes a signal to be transmitted, sends the processed signal to the transmitter 112, and processes a signal received by the receiver 114.

If necessary, the processor 120 may store information included in an exchanged message in the memory 130. Due to this structure, the user equipment 100 can perform the methods described in various embodiments of the present invention.

The transmitter 212 and the receiver 214 of the base station 200 are configured to transmit and receive signals to and from another base station and user equipments, and the processor 220 is functionally connected to the transmitter 212 and the receiver 214 to control processes performed at the transmitter 212 and the receiver 214 for transmitting and receiving signals to and from other devices. The processor 220 processes a signal to be transmitted, sends the processed signal to the transmitter 212, and processes a signal received by the receiver 214. If necessary, the processor 220 may store information included in an exchanged message in the memory 230. Due to this structure, the base station 200 can perform the methods described in various embodiments of the present invention.

The processors 120 and 220 of the user equipment 100 and the base station 200 instruct (for example, control, adjust, or manage) operation of the user equipment 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

Each of the processors 120 and 220 of the present invention may be called a controller, a microcontroller, a microprocessor, a microcomputer, etc. Each of the processors 120 and 220 may be implemented by hardware, firmware, software, or any combination thereof.

When the embodiments of the present invention are implemented by hardware, application specific integrated circuits (ASICs), digital signal processors (DSPs), digital signal processing devices (DSPDs), programmable logic devices (PLDs), field programmable gate arrays (FPGAs), and the like may be included in the processors 120 and 220.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein. In addition, although the present invention has been described with reference to the preferred embodiments thereof, it will be apparent to those skilled in the art that not only the invention is not limited to the aforementioned specific embodiments but various modifications can be made in the present invention without departing from the spirit or scope of the invention. Such modifications are not to be construed individually from the technical spirit and scope of the present invention.

In addition, both an apparatus invention and a method invention are explained in the present specification, and if necessary, the explanation on both the inventions can be complementally applied.

INDUSTRIAL APPLICABILITY

The above-described method can be applied to not only the 3GPP system but also various wireless communication systems including an IEEE 802.16x system and an IEEE 802.11x system. Further, the proposed method can also be applied to an mmWave communication system using ultra high frequency band.

What is claimed is:

1. A method for receiving a Phase Tracking Reference Signal (PTRS) by a user equipment (UE) in a wireless communication system, the method comprising:
   receiving, from a base station (BS), modulation and coding scheme (MCS) information for each of two codewords; and
   receiving, from the BS, the PTRS via a PTRS antenna port based on the MCS information,
   wherein, based on the two codewords having a different MCS, the PTRS antenna port has been mapped to a demodulation reference signal (DMRS) antenna port with the lowest index among one or more DMRS antenna ports for a codeword with the highest MCS among the two codewords, and
   wherein, based on the two codewords having the same MCS, the PTRS antenna port has been mapped to a DMRS antenna port with the lowest index among a plurality of DMRS antenna ports for a codeword with the lowest index among the two codewords.

2. The method of claim 1, wherein all DMRS antenna ports related to the two codewords belong to one DMRS antenna port group.

3. The method of claim 1, wherein the PTRS antenna port has at least one of subcarrier indexes configured for the DMRS port to which the PTRS antenna port has been mapped.

4. The method of claim 1, wherein the PTRS antenna port and the DMRS port to which the PTRS antenna port has been mapped have the same precoding.

5. The method of claim 1, further comprising:
   transmitting, to the B S, channel quality information (CQI) for each of the two codewords; and
   transmitting, to the BS, information on layer index of a layer with the best channel quality among one or more layers included in a codewords with the highest CQI among the two codewords.

6. An apparatus for receiving a Phase Tracking Reference Signal (PTRS) in a wireless communication system, the apparatus comprising:
   at least one processor; and
   at least one computer memory operably connectable to the at least one processor and storing instructions that, when executed by the at least one processor, perform operations comprising:
   receiving modulation and coding scheme (MC S) information for each of two codewords from a base station (BS); and
   receiving the PTRS via a PTRS antenna port based on the MCS information,
   wherein, based on the two codewords having a different MCS, the PTRS antenna port has been mapped to a demodulation reference signal (DMRS) antenna port with the lowest index among one or more DMRS antenna ports for a codeword with the highest MCS among the two codewords, and
   wherein, based on the two codewords having the same MCS, the PTRS antenna port has been mapped to a DMRS antenna port with the lowest index among a plurality of DMRS antenna ports for a codeword with the lowest index among the two codewords.

7. The apparatus of claim 6, wherein all DMRS antenna ports related to the two codewords belong to one DMRS antenna port group.

8. The apparatus of claim 6, wherein the PTRS antenna port has at least one of subcarrier indexes configured for the DMRS port to which the PTRS antenna port has been mapped.

9. The apparatus of claim 6, wherein the PTRS antenna port and the DMRS port to which the PTRS antenna port has been mapped have the same precoding.

10. The apparatus of claim 6, further comprising:
    transmitting, to the B S, channel quality information (CQI) for each of the two codewords; and
    transmitting, to the BS, information on layer index of a layer with the best channel quality among one or more layers included in a codewords with the highest CQI among the two codewords.

11. A method for transmitting a Phase Tracking Reference Signal (PTRS) by a base station (BS) in a wireless communication system, the method comprising:
    transmitting, to a user equipment (UE), modulation and coding scheme (MCS) information for each of two codewords; and
    transmitting, to the UE, the PTRS via a PTRS antenna port based on the MCS information,
    wherein, based on the two codewords having a different MCS, the PTRS antenna port has been mapped to a demodulation reference signal (DMRS) antenna port with the lowest index among one or more DMRS antenna ports for a codeword with the highest MCS among the two codewords, and
    wherein, based on the two codewords having the same MCS, the PTRS antenna port has been mapped to a DMRS antenna port with the lowest index among a plurality of DMRS antenna ports for a codeword with the lowest index among the two codewords.

12. The method of claim 11, wherein all DMRS antenna ports related to the two codewords belong to one DMRS antenna port group.

13. The method of claim 11, wherein the PTRS antenna port has at least one of subcarrier indexes configured for the DMRS port to which the PTRS antenna port has been mapped.

14. The method of claim 11, wherein the PTRS antenna port and the DMRS port to which the PTRS antenna port has been mapped have the same precoding.

15. The method of claim 11, further comprising:
   receiving, from the UE, channel quality information (CQI) for each of the two codewords; and
   receiving, from the UE, information on layer index of a layer with the best channel quality among one or more layers included in a codewords with the highest CQI among the two codewords.

16. A non-transitory medium which is readable by a processor and which stores instructions to cause the processor to perform the method of claim 1.

\* \* \* \* \*